July 3, 1962  B. CRETIN-MAITENAZ  3,041,789
MACHINE FOR THREE-DIMENSIONAL COPYING
Filed April 7, 1960  4 Sheets-Sheet 2
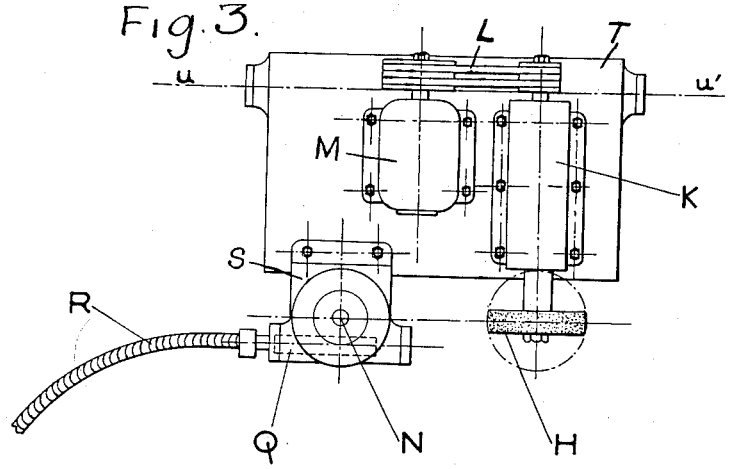
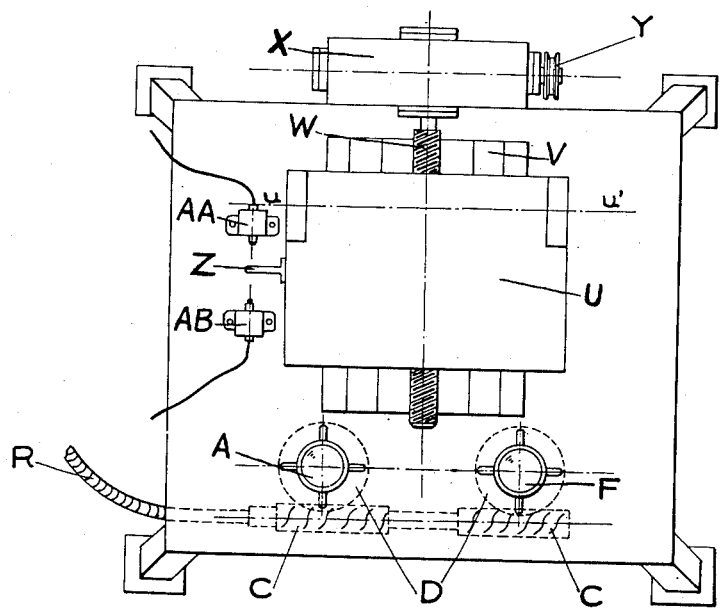

July 3, 1962 B. CRETIN-MAITENAZ 3,041,789
MACHINE FOR THREE-DIMENSIONAL COPYING
Filed April 7, 1960 4 Sheets-Sheet 4

3,041,789
MACHINE FOR THREE-DIMENSIONAL COPYING
Bernard Cretin-Maitenaz, Joinville-le-Pont, France, assignor to Societe des Lunetiers Cottet, Poichet, Tagnon & Cie, Paris, France
Filed Apr. 7, 1960, Ser. No. 20,616
Claims priority, application France Apr. 7, 1959
4 Claims. (Cl. 51—101)

Copying machines, whose purpose is to reproduce surfaces of varying shapes, are of the hydraulic, pneumatic, mechanical or electronic type operating by displacement of a feeler exploring the surface of the model.

When very great fidelity of reproduction is sought, the complexity of the means used to control the cutter or the grinding-wheel increases significantly, in models resorted to hitherto, as the required degree of copying accuracy increases.

The present invention has for its object a machine for three-dimensional copying, which enables precision work to be executed, yet which is of simple construction and easy and rapid to handle.

This machine for three-dimensional copy-cutting of a workpiece according to a model of any shape whatsoever comprises two spindles mounted parallel to each other on one portion of the machine which are in synchronous rotation and which carry, respectively, the model to be copied and the part to be cut, a follower and a grinding-wheel mounted on a second portion of the machine which is movable with respect to the first portion, the working surface of the grinding-wheel being a surface of revolution and said working surface of the grinding-wheel being translated with respect to the operative surface of the follower by a margin equal to the translational displacement of the part to be cut with respect to the model, and means for displacing the second portion of the machine with respect to the first portion while at the same time retaining these identical translational displacements and contact of the follower on the model.

The characteristics and advantages of the invention will become more clearly apparent from the description given below, with reference to the accompanying drawings, by way of examples only and not in a limiting sense.

In these drawings:

FIGURE 3 is a plan view of the second portion of the machine and of the components which are mounted on it, in particular the follower-support and the grinding wheel-support.

FIGURE 4 is a plan view of the first portion of the machine, the second portion having been removed.

Figure 1:
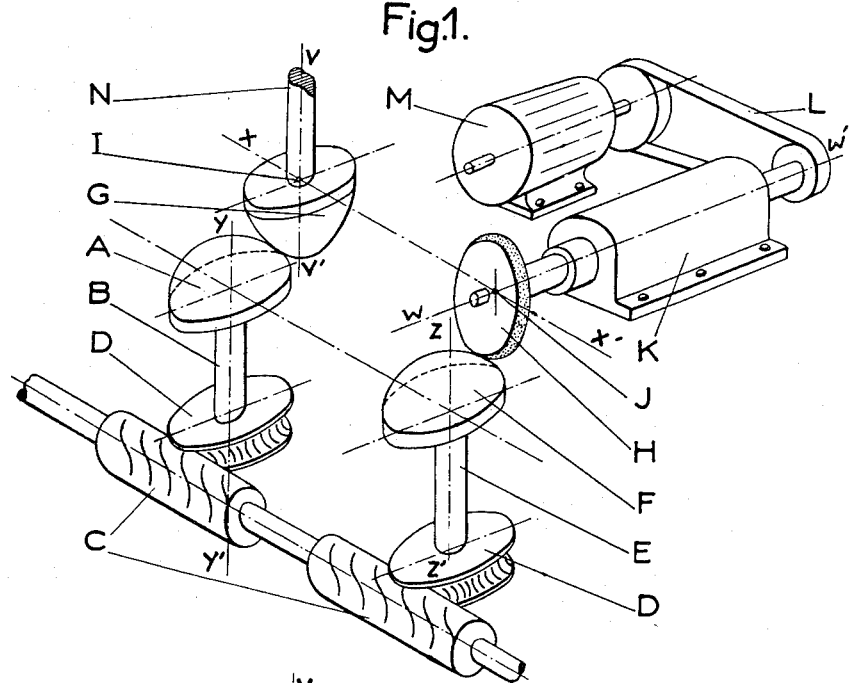
FIGURE 1 shows a possible layout for the various component elements in the case where the grinding-wheel and its homologue follower have spherical contours.

Referring now to FIG. 1, the model to be copied A is integral with a spindle B which, through the medium of worm gears C meshing with grooved wheels D, rotates at the same speed as the spindle E carrying the part to be cut F. The follower G is of spherical shape and is rotatably mounted on a vertical spindle N of axis $vv'$, while the grinding-wheel H, whose working surface is likewise spherical and of the same radius as the follower G, rotates about an axis $ww'$ which is horizontal, for example.

The centers I of the follower G and J of the wheel H are located on a straight line $xx'$ which is horizontal and parallel to the vertical plane containing the axis $yy'$ of spindle B and the axis $zz'$ of spindle E.

Figure 5:
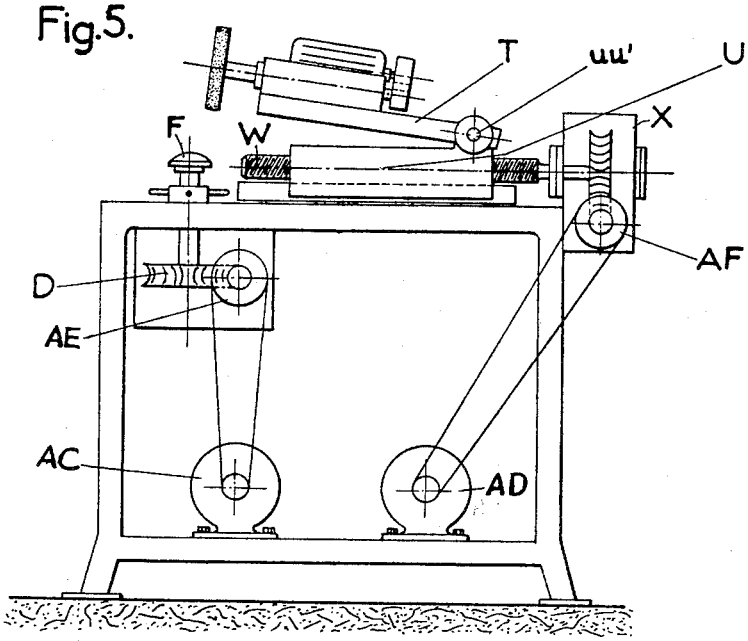
FIGURE 5 is a view in elevation.

By mechanical means which are not shown on FIG. 1, but which are visible on FIGS. 3, 4 and 5, the axis $xx'$ is able to move away progressively from the plane containing the axis $yy'$ and the axis $zz'$, the follower G remaining at all times in contact with the model A. By reason of this displacement of the axis $xx'$ parallel to itself and the rotation of model A about $yy'$, the point of contact between the follower G and the model A moves over the latter from its center down to its edge. Similarly, the abrasive face of the grinding wheel H generates a surface F in the course of the displacement of the axis $xx'$ referred to. If this operation is initiated when the contact point of the follower G is located at the center of the model A, namely when the axis $vv'$ lies along the extension of the axis $yy'$, generation of the part F will be effected from the centre to the edge and be completed when said contact point reaches the peripheral extremity of the model A.

FIG. 1 also shows diagrammatically a spindle K which carries the grinding-wheel H and which, through the medium of a belt L, is driven in rotation by a motor M. To allow the movement referred to of the axis $xx'$ to take place, the vertical spindle N, the horizontal spindle K and the motor M are carried on a mobile table T which, while providing the sweeping motion, at the same time ensures that the follower G stays in contact with the model A at all times. The method of setting up the mobile table is shown in FIGS. 3, 4 and 5. In the layout described hereinabove, in particular with reference to FIG. 1, the machine according to the invention insures the obtainment of an identical copy of the model A.

Figure 2:
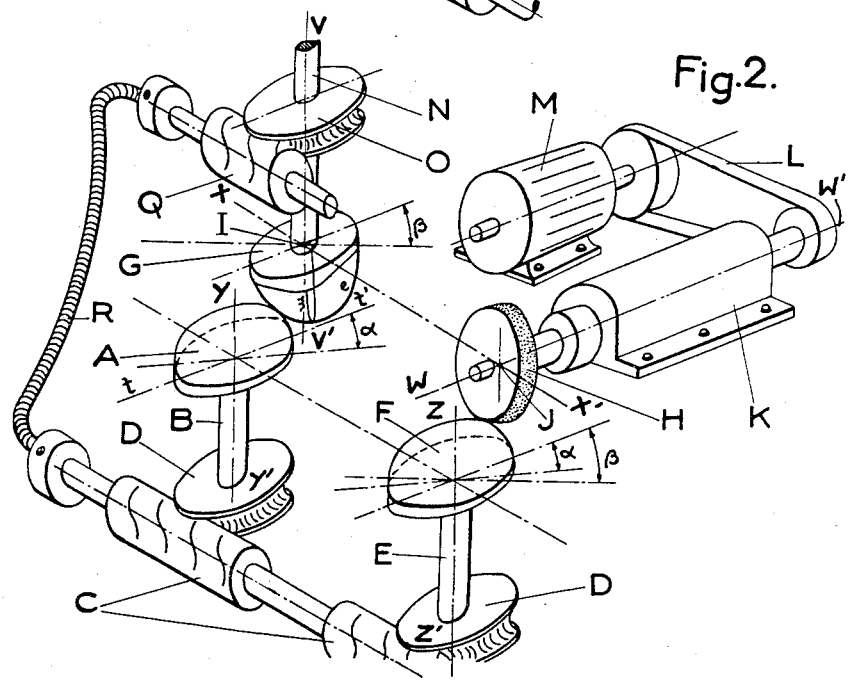
FIGURE 2 shows a possible layout of the component elements when it is desired to generate a surface which is different from the surface of the model and which is derived from the latter by three-dimensional anamorphosis.

If it is desired to obtain a part F whose surface is similar to that of the model A but which differs from it, nonetheless, in certain characteristics, then the variant shown in FIG. 2 can be adopted. In this variant, the layout for the model A and for the part to be cut F remains unchanged, the modifications to be carried out affecting only the upper moving assembly. In this particular case, rotation of the follower G about its axis $vv'$ is no longer freely governed by the friction forces set up between the roller and the model, but is controlled by a grooved wheel O which is driven by a worm Q. By means of a flexible drive R, for example, or by any other suitable means, this worm gear is coupled to the lower worm gears C. The demultiplication ratios for the various drives are established so that the spindle N and the follower G rotate at the same speed as the model A and the part to be cut F. If the shape of the follower G differs from the abrasive portion of the grinding-wheel H, it is clear that the shape obtained for the part F will also differ from the model to be copied A, the difference between the two shapes being essentially dependent upon the manner of shape variation of the follower G with respect to the grinding-wheel H.

As in the arrangement shown in FIG. 1, the spindles N and K and the motor M are all integral with a moving assembly which enables the necessary movements to be executed, as described precedingly with reference to FIG. 1.

To give some indication of the results it is possible to achieve with the arrangement shown in FIG. 2, mention will be made of the application of this layout for generating a surface for use in the optical instrument trade, a specific application in which the model A has a progressive surface whose symmetry axis forms an angle $\alpha$ with the horizontal axis $tt'$ and the follower G is a deformed toroidal surface whose equator $e$ has the same radius as the grinding-wheel H and forms an angle $\beta$ with the vertical plane passing through $tt'$, the curvature of the meridian $m$ of the follower being different from the curvature of its equator $e$. The surface F obtained will then be a progressive toroidal surface characterized by a progressiveness whose directing plane will also be at an angle $\alpha$ with the horizontal, while the difference in radii of curvature will engender a cylindrical effect of angle $\beta$. In other words, with this arrangement, the progressive effect obtained from the model is superimposed on the toroidal effect derived from the follower, the characteristic angle of each of these effects being the same as the angles at which the respective elements have been set up.

FIG. 3 shows, in plan view, the mobile table T on which are mounted the follower-carrying spindle N, the grinding-wheel H and the spindle K which carries the latter and which is driven in rotation, via the belt L, by the motor M. The follower-carrying spindle N is rotated by a flexible drive R off a worm and grooved-gear drive housed inside the casing S. The table T is rotatable about a horizontal shaft $uu'$ through the medium of which it is mounted on a slider U (see FIG. 4) which travels along guides V and which is driven by a feed-screw W which is itself driven in slow rotation by a gearbox X.

The model A and the part F can be seen in FIG. 4, in which the grooved gearwheels D and the worm gears C which drive them in synchronous motion are shown in dotted lines. Also shown is the lower end R of the flexible drive connecting the worm gear Q to the two worm gears C. A finger Z, which is integral with the slider U, operates one of the limit switches AA or AB when the slider reaches the end of its stroke. With a layout as described above, the working cycle can be broken down as follows:

(a) Cycle started when grinding-wheel is at center of part to be ground F. The motor AC drives pulley AE which in turn rotates the parts A and F, while motor AD rotates pulley AF of the gearbox X, the feed-screw W of the latter producing cross-traverse from the center to the edge of the part F. While this motion is taking place, the table T pivots about its shaft $uu'$ in accordance with the motion imparted to it through contact of the follower G with the model A.

(b) When grinding-wheel reaches edge of part F, finger Z operates reversing contactor AA and causes automatic return to the starting point by reversal of at least the direction of rotation of the motor AD.

(c) As soon as grinding-wheel has returned to center, reverser AB stops machine and indicates that working cycle is ended by means of a light or sound indicator.

By way of variants, the working cycle may be set as follows:

(a) Starting point at far left end of machine (FIG. 5).
(b) Stopping point at far right.

or alternatively, (a) Starting point at center
(b) Reverse at far left
(c) Reverse at far right
(d) Stop at center.

This description has been given by way of example only and not in a limiting sense. The specific instance cited in respect of the grinding of optical components is but one possible application of the machine. It is clearly possible, without departing from the scope of the invention, to use this machine for other purposes, examples being the grinding of materials other than glass or the replacement of the grinding-wheel by a cutter, an abrasive fabric or any other tool allowing metal to be removed.

Similarly, in the interests of simplifying the description, the machine illustrated, FIGS. 1 to 6, comprises only one machining station. For production on a larger scale, however, it is possible as shown in FIG. 7 to set up a multiplicity of moving spindles $K_1$ and $K_2$ on the moving table T to ensure simultaneous machining of a plurality of parts to be cut mounted on a plurality of spindles rotating in synchronization with the spindle carrying a single model.

Figure 6:
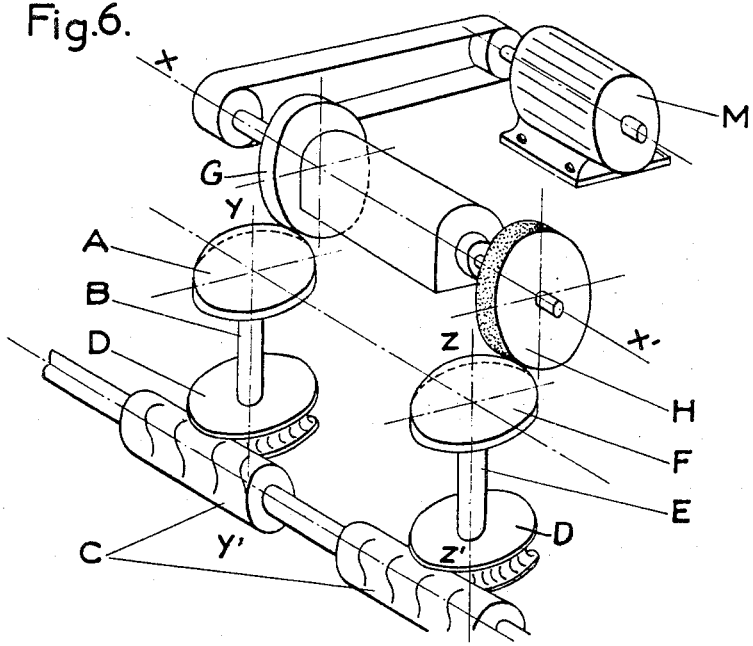
FIGURE 6 shows an arrangement in which the follower and the grinding-wheel are both cylindrical.
Figure 7:
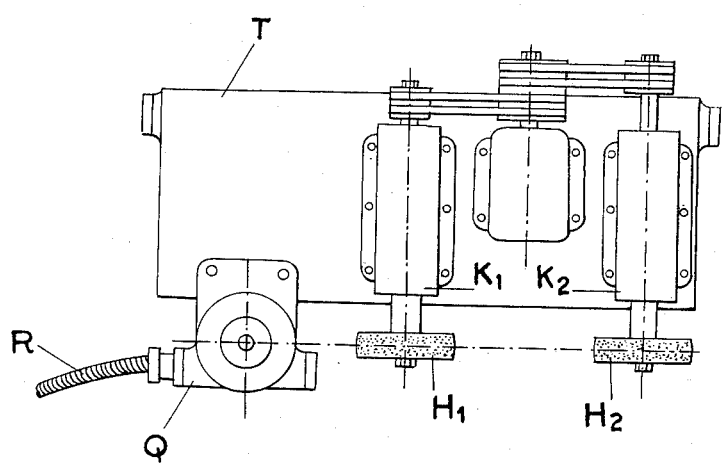
FIGURE 7 shows, in a manner similar to FIGURE 3, another form of construction permitting the simultaneous machining of a plurality of parts to be cut by copying a same single model.

It is likewise possible to adopt follower shapes which are different from those shown in FIGS. 1 and 2 and to resort, for instance, to cylindrical followers and grinding-wheels, using, say, an arrangement such as that in FIG. 6, the axis $xx'$ being then the axis of the follower G and of the grinding-wheel H. Such a layout allows the shape A to be copied exactly, yet it also allows a shape F to be obtained which is different from the shape A to the extent that the radius of the cylindrical follower G differs from the radius of the cylindrical grinding-wheel H. In that case, the radius of curvature at the top of the part F will be greater or less than the radius of curvature at the top of the model A by an amount equal to the difference between the radii of curvature of the follower G and grinding wheel H.

In the foregoing descriptions and related drawings, the models and the parts to be cut are shown to be convex. To cut concave surfaces, all that is needed is to insure that, at the contact point, the radii of curvature of the follower or the grinding-wheel are always less than the radii of the model or the part respectively.

What I claim is:

1. A machine for copying the surface of a model on a part to be cut, comprising a stand, two mounts respectively supporting the model and the part to be cut, said two mounts being rotatably mounted on the stand about two parallel axes, two rectilinear and parallel slides carried by the stand in a plane perpendicular to the axes of the mounts, a carriage slidably mounted in said slides, a table mounted on said carriage in oscillation about an axis parallel to the plane of the slides and perpendicular to said slides, a copying follower embodying an operative surface of revolution defined by an axis and a meridian and mounted on said table rotatably about an axis coinciding with said axis of said surface or revolution, the weight of said table causing said follower to bear against the surface of the model at a point lying substantially in the plane passing through the axis of rotation of the model mount perpendicularly to the oscillation axis of said table, a part-cutting grinding wheel having an operative surface of revolution defined by an axis and a meridian identical to the meridian of the operative surface of said follower, said grinding wheel being mounted on said table rotatably about said axis of its surface of revolution, driving means to rotate said grinding wheel which consequently cuts a point on the surface of said part by duplicating the corresponding point on the surface of the model, further driving means to rotate the model and the part about their axes at equal speed and to thereby extend the duplication to all points on a circle on the model swept by said follower, and still further means to traverse said carriage along its slides, as the result of which traverse motion the operative point on the operative surface of said grinding wheel traverses the axis of rotation of the mount and thereby extends the cutting action to the whole surface of circles coaxial with that axis.

2. A machine according to claim 1 for cutting a part so as to produce a surface which is an anamorphosis of the surface of a model, comprising a third set of driving means to rotate the copying follower about its axis at the same speed as, but in the opposite direction to, the rotation of the model and the part.

3. A machine as claimed in claim 1, in which the operative surface of revolution of the copying follower and the operative surface of revolution of the grinding wheel are spherical.

4. A machine for copying the surface of a model on a part to be cut, comprising a stand, two mounts respectively supporting the model and the part to be cut, said two mounts being rotatably mounted on the stand about two parallel axes, two rectilinear and parallel slides carried by said stand in a plane perpendicular to the axes of the mounts, a carriage slidably mounted in said slides, a table mounted on said carriage in oscillation about an axis parallel to the plane in which lie the axes of rotation of the two mounts and perpendicular to said axes of the mounts, a copying follower having a cylindrical operative surface of a certain radius developed about an axis, said copying follower being mounted rotatably about its axis on said table and said copying follower axis being parallel to the oscillation axis of said table on said carriage, a part-cutting grinding wheel having a cylindrical abrasive surface of radius equal to that of the operative surface of said copying follower, said grinding wheel being mounted rotatably on said table coaxially with said copying follower, driving means to rotate said grinding wheel which consequently cuts a point on the surface of said part by duplication of the corresponding point on the surface of said model, further driving means to rotate the model and the part at equal speed and to thereby extend duplication to the closed line on said model swept by said follower according to the position of said carriage and still further driving means to traverse said carriage along said slides, in the course of which traverse motion the axis of the follower and the axis of the grinding wheel traverse the axes of rotation of the model and the mount respectively, thereby extending duplication to the whole surface of the model, along successive closed lines each of which corresponds to a given carriage position.

References Cited in the file of this patent
UNITED STATES PATENTS

| | | |
|---|---|---|
| 1,389,835 | Lecomte | Sept. 6, 1921 |
| 2,582,170 | Schon | Jan. 8, 1952 |